(12) United States Patent
Huang et al.

(10) Patent No.: US 8,107,763 B2
(45) Date of Patent: Jan. 31, 2012

(54) IMAGE BRIGHTNESS ADJUSTING METHOD

(75) Inventors: Ying-Jieh Huang, Taipei (TW);
Chiou-Shann Fuh, Taipei (TW);
Hsiang-Ting Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 710 days.

(21) Appl. No.: 12/268,015

(22) Filed: Nov. 10, 2008

(65) Prior Publication Data

US 2010/0061653 A1    Mar. 11, 2010

(30) Foreign Application Priority Data

Sep. 5, 2008    (TW) ................................ 97134179 A

(51) Int. Cl.
*G06K 9/40* (2006.01)
(52) U.S. Cl. ............................ 382/274; 348/687; 345/690
(58) Field of Classification Search .......... 382/100–305; 348/251, 254, 630–631, 687–689; 345/690
See application file for complete search history.

(56) References Cited

U.S. PATENT DOCUMENTS

| | | | | |
|---|---|---|---|---|
| 5,696,840 A * | 12/1997 | Usami | ........................ | 382/167 |
| 5,748,199 A * | 5/1998 | Palm | ............................ | 345/473 |
| 6,741,285 B2 * | 5/2004 | Takizawa | ...................... | 348/364 |
| 7,126,632 B2 * | 10/2006 | Hofflinger et al. | ............ | 348/256 |
| 7,173,663 B2 * | 2/2007 | Skow et al. | ................... | 348/364 |
| 7,386,185 B2 * | 6/2008 | Watanabe et al. | ............. | 382/274 |
| 7,440,612 B2 * | 10/2008 | Ogata et al. | ................... | 382/167 |
| 7,773,158 B2 * | 8/2010 | Yamashita et al. | ............ | 348/678 |
| 7,773,826 B2 * | 8/2010 | Watanabe et al. | ............. | 382/274 |
| 7,880,814 B2 * | 2/2011 | Yamashita et al. | ............ | 348/678 |
| 7,936,919 B2 * | 5/2011 | Kameyama | .................... | 382/167 |
| 2003/0142879 A1 * | 7/2003 | Kim | ............................. | 382/274 |

* cited by examiner

*Primary Examiner* — Manav Seth
(74) *Attorney, Agent, or Firm* — Kirton & McConkie; Evan R. Witt

(57) ABSTRACT

An image brightness adjusting method is provided. The brightness values of all pixels of the image are firstly increased in various increasing degrees. Next, the increased brightness values are decreased in various decreasing degrees according to the original brightness values, thereby avoiding over-increasing the brightness values of the image. Moreover, the use of the color saturation values to adjust the brightness values can avoid the unnatural image appearance.

5 Claims, 4 Drawing Sheets

IMAGE BRIGHTNESS ADJUSTING METHOD

FIELD OF THE INVENTION

The present invention relates to an image processing method, and more particularly to an image brightness adjusting method.

BACKGROUND OF THE INVENTION

With increasing development of technologies, image capture devices have experienced great growth and are rapidly gaining in popularity. For example, an image capture device such as a camera is widely used in the workplace or in the traveling route for capturing an image. Generally, the quality of the image captured by the image capture device is affected by some factors such as the location of the light source or the brightness of the light source. If the location or the brightness of the light source is improper, a back light phenomenon, a side light phenomenon or an insufficient brightness value possibly occurs. In a case of the back light, the light source is behind the subject such that the brightness value at the front side of the subject is very low. In a case of the side light, the light source is located at one side of the subject such that the brightness value at the opposite side of the subject is very low. In a case of the insufficient brightness value, the luminance of the light source is very weak such that the image looks dark.

For overcoming the above drawbacks of uneven brightness values and low brightness values, some methods have been disclosed in order to achieving brightness homogenization or increase the brightness values. These methods include for example a histogram equalization method, a local histogram equalization method, a partially overlapped sub-block histogram equalization method, and a multiple-scale Retinex (MSR) method.

By the histogram equalization method, the brightness values of the image are collected in terms of statistics, the probabilities of respective brightness values are plotted as a cumulative conversion curve, and the converted brightness values are obtained according to the cumulative conversion curve. The distribution of the converted brightness values has an increased contrast. In other words, the histogram equalization method usually increases the contrast of the image. Since the contrast of the image processed by the histogram equalization method is usually over-increased, the processed image looks unnatural.

By the local histogram equalization method, all pixels of the original image are equalized independently and subject to histogram equalization. The contrast increase in the darker region of the image is obvious. The local histogram equalization method, however, needs enormous calculation and also results in unnatural image appearance.

The partially overlapped sub-block histogram equalization method partitions the image into multiple sub-blocks. These sub-blocks are subject to histogram equalization subject to histogram equalization. For preventing over-distortion of the image, these sub-blocks are partially overlapped with each other. The partially overlapped sub-block histogram equalization method can reduce the calculation amount and save calculating time. Since the sub-blocks are processed in replace of pixels, the contrast increase in the darker region of the image is not obvious.

The multiple-scale Retinex (MSR) method is developed and extended from the Retinex image enhancement techniques. The MSR method partitions the image into two parts, i.e. the bright/dark distribution and the image object details. The MSR method blurs the bright/dark distribution and performs a brightness-increasing procedure. After the bright/dark distribution and the image object details are combined together, a more natural image appearance is resulted. In the MSR method, the procedure of blurring the image often partially eliminates acute regions of the image, and thus the acute regions are readily separated apart. In other words, the MSR method results in a useless image with coronas due to the blurring procedure.

Although the above-mentioned techniques can increase the brightness values of the image, these techniques have respective drawbacks. Therefore, there is a need of providing an image processing method of increasing brightness values of the image and avoiding the over-bright or unnatural image appearance.

SUMMARY OF THE INVENTION

It is an object of the present invention to provide an image brightness adjusting method for properly increasing the brightness values of the image and resulting in natural image appearance.

In accordance with an aspect of the present invention, there is provided an image brightness adjusting method for adjusting brightness values of multiple pixels of an image. All pixels $P(x,y)$ of the image have respective brightness values $I(x,y)$ and respective color saturation values $Sat(x,y)$. The image brightness adjusting method includes steps of:

increasing the brightness values $I(x,y)$ of the pixels $P(x,y)$ by a logarithmic function computation, which comprises sub-steps of:
  performing the logarithmic function computation on the brightness values $I(x,y)$ of the pixels $P(x,y)$ to obtain corresponding gain values $G(x,y)$;
  multiplying the brightness values $I(x,y)$ by the gain values $G(x,y)$ to obtain corresponding gained brightness values;
  and amplifying gained brightness values by a magnification S to obtain corresponding brighter brightness values $I_{Brighter}(x,y)$; decreasing the brightness values of the image, which comprises sub-steps of:
  decreasing the brightness values $I(x,y)$ of the pixels $P(x,y)$ to obtain corresponding first brightness decay values $D_{Brightness}(x,y)$, wherein the first brightness decay values $D_{Brightness}(x,y)$ are determined according to the brightness values $I(x,y)$ of the pixels $P(x,y)$;
  decreasing the brightness values $I(x,y)$ of the pixels $P(x,y)$ to obtain corresponding second brightness decay values $D_{saturation}(x,y)$, wherein the second brightness decay values $D_{saturation}(x,y)$ are determined according to corresponding average color saturation values $AvgSat(x,y)$, and each of the average color saturation values $AvgSat(x,y)$ indicates the average of the color saturation values $Sat(x,y)$ of a specified pixel $P(x,y)$ and neighboring pixels thereof; and
  obtaining darker brightness values $I_{Darker}(x,y)$ according to the first brightness decay values $D_{Brightness}(x,y)$ and the second brightness decay value $D_{saturation}(x,y)$; and
obtaining corrected brightness values $I_{Adjusting}(x,y)$ according to the brighter brightness values $I_{Brighter}(x,y)$ and the darker brightness values $I_{Darker}(x,y)$, wherein the corrected brightness values $I_{Adjusting}(x,y)$ are calculated by following equations:

$$I_{Adjusting}(x,y) = I_{Brighter}(x,y) \times I_{Darker}(x,y);$$

$$I_{Brighter}(x,y) = S \times (1 + G(x,y)) \times I(x,y);$$

$$G(x,y) = \log(2 - I(x,y));$$

$$I_{Darker}(x,y) = D_{Brightness}(x,y) \times D_{saturation}(x,y);$$

$$D_{Brightness}(x,y) = 1/(1 + I(x,y))^{Power};$$

$$D_{saturation}(x,y) = (\text{AvgSat}(x,y) + 1)/2;$$

in which POWER is a power value.

In an embodiment, the image brightness adjusting method is applied to a HSV (hue, saturation, value) color space, and the logarithmic function computation uses a logarithmic function whose base is 2.

In an embodiment, the domain of the brightness values I(x,y) of the pixels P(x,y) between 0 and 1 is adjusted to be between 1 and 2.

In an embodiment, the magnification S is 3.

In an embodiment, the POWER is 4.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides an image brightness adjusting method. The brightness values of all pixels of the image are firstly increased and then decreased in different decreasing degrees. During the procedure of decreasing the brightness values, the brightness values of the originally brighter regions of the image are reduced to a larger extent but the brightness values of the originally darker regions of the image are reduced to a smaller extent, so that the resulted brightness values of the originally darker regions are increased.

Figure 1A:
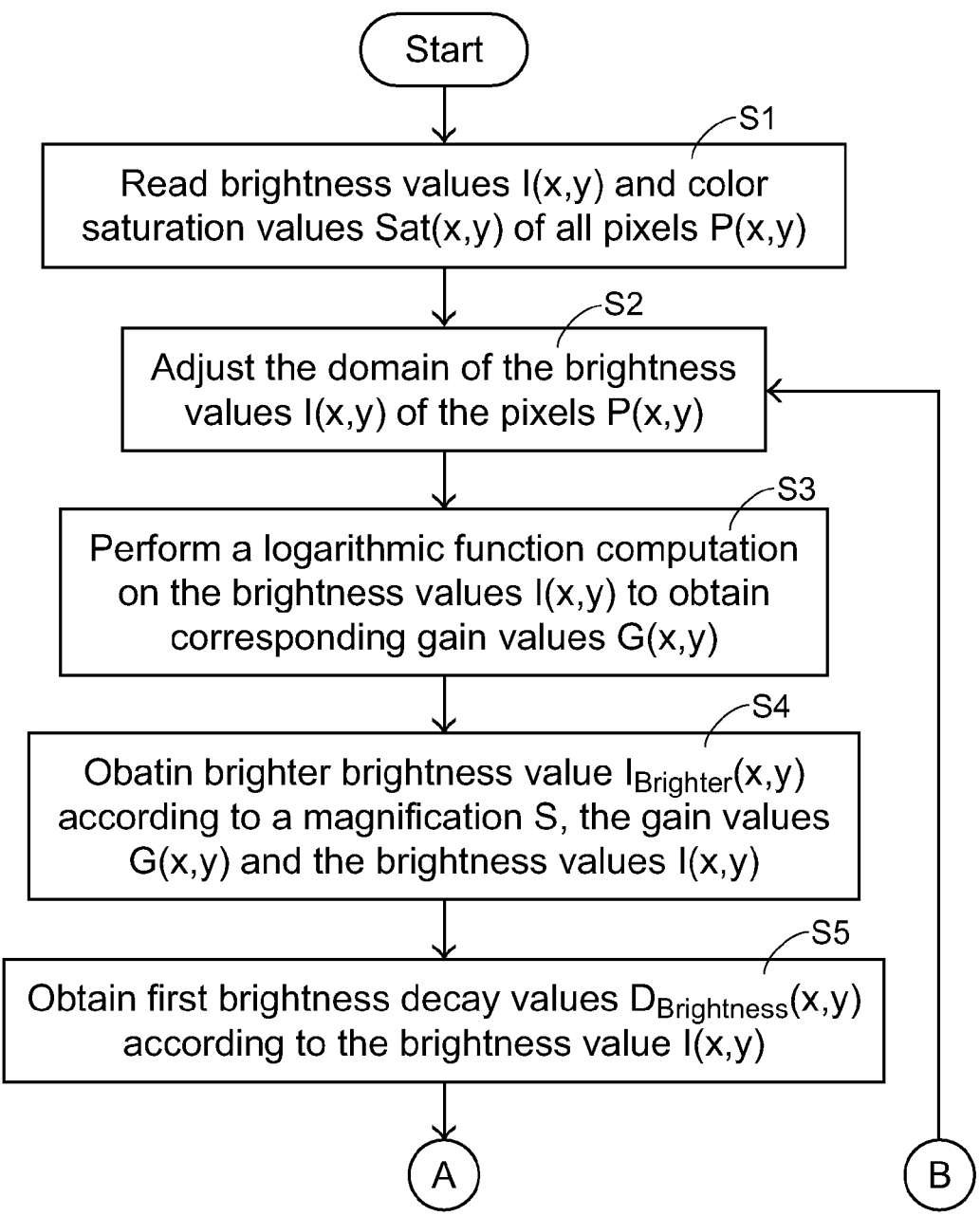
FIGS. 1A and 1B schematically illustrate a flowchart of an image brightness adjusting method of the present invention.
Figure 1B:
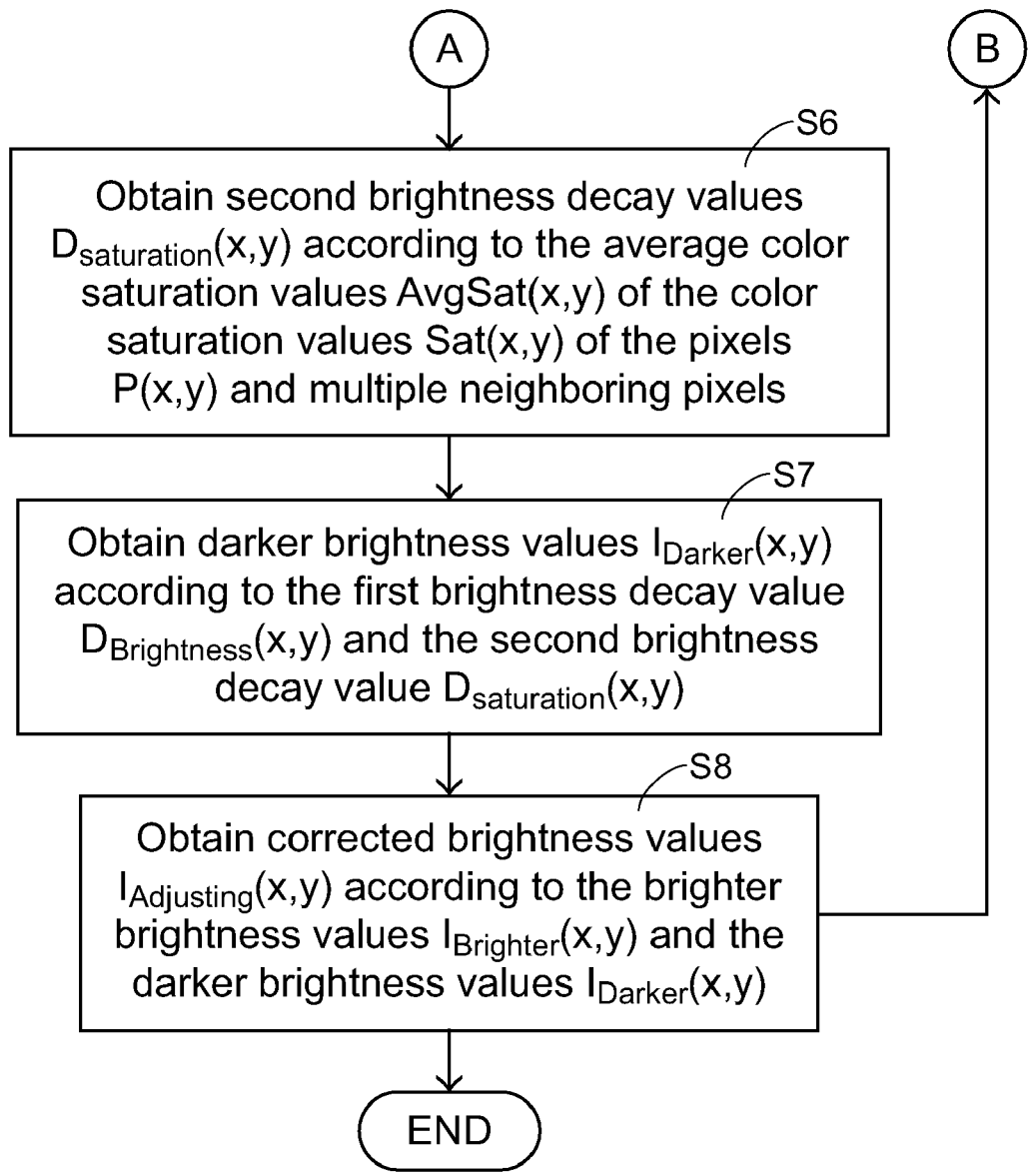

Hereinafter, an image brightness adjusting method of the present invention will be illustrated with reference to the flowchart of FIGS. 1A and 1B.

In response to a command to increase the brightness value of an image, the image brightness adjusting method of the present invention is started. First of all, the brightness values I(x,y) and the color saturation values Sat(x,y) of all pixels P(x,y) of the image are read (Step S1). After the brightness values I(x,y) and the color saturation values Sat(x,y) of the whole image are read, a brightness-increasing procedure is performed (steps S2, S3 and S4). In the step S2, the domain of the brightness values I(x,y) of the pixels P(x,y) are adjusted. In the step S3, the brightness values I(x,y) are subject to a logarithmic function computation, thereby obtaining corresponding gain values G(x,y). In the step S4, brighter brightness values $I_{Brighter}(x,y)$ are obtained according to a magnification S, the gain values G(x,y) and the brightness values I(x,y). After the brightness-increasing procedure is implemented, a brightness-decreasing procedure is performed (steps S5, S6 and S7). In the step S5, a first brightness decay values $D_{Brightness}(x,y)$ are obtained according to the brightness values I(x,y). In the step S6, second brightness decay values $D_{saturation}(x,y)$ are obtained according to the average color saturation values AvgSat(x,y) of the color saturation values Sat(x,y) of the pixels P(x,y) and their multiple neighboring pixels. In the step S7, darker brightness values $I_{Darker}(x,y)$ are obtained according to the first brightness decay values $D_{Brightness}(x,y)$ and the second brightness decay values $D_{saturation}(x,y)$. Afterwards, in the step S8, corrected brightness values $I_{Adjusting}(x,y)$ are obtained according to the brighter brightness values $I_{Brighter}(x,y)$ and the darker brightness values $I_{Darker}(x,y)$. After the corrected brightness value of a specified pixel is obtained, the above steps are performed on the next pixel until the corrected brightness values of all pixels are obtained.

Figure 2:
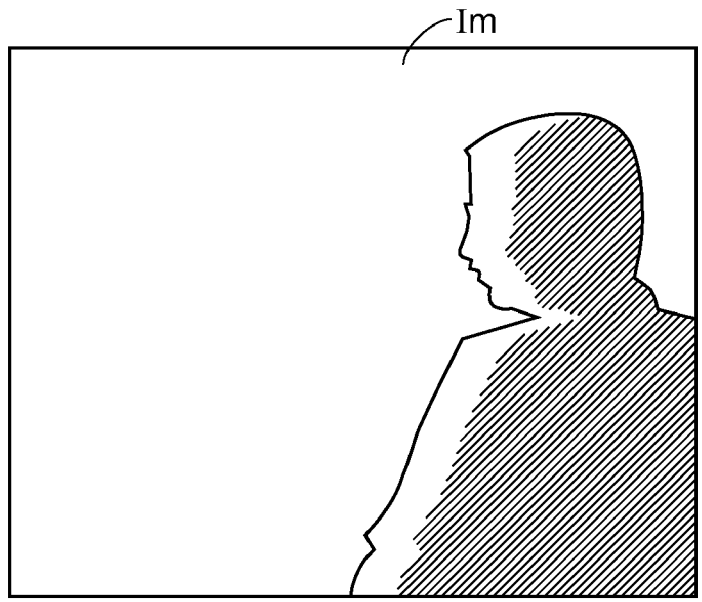
FIG. 2 is a schematic view illustrating an image to be processed by an image brightness adjusting method according to a preferred embodiment of the present invention.
Figure 3:
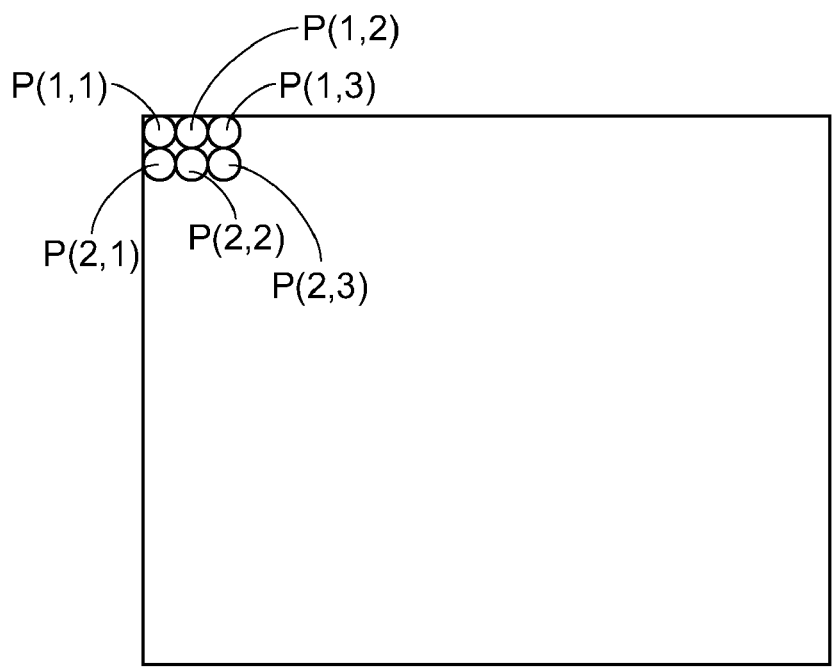
FIG. 3 is a schematic view illustrating some pixels of the image of FIG. 2.

FIG. 2 is a schematic view illustrating an image to be processed by an image brightness adjusting method according to a preferred embodiment of the present invention. FIG. 3 is a schematic view illustrating some pixels of the image of FIG. 2. Please refer to FIGS. 2 and 3. The image Im shown in FIG. 2 is captured by an image capture device. Due to a side light, the brightness values at the right-half region of the subject are relatively low and need to be increased. In accordance with a key feature of the present invention, the brightness values at the low-brightness regions are subject to a logarithmic function computation, and thus the original brightness values are increased in logarithmic increment. In FIG. 3, some pixels of the image Im, for example P(1,1), P(1,2), P(1,3), ..., are shown. After the image brightness adjusting method of the present invention is started, the brightness values I(x,y) and the color saturation values Sat(x,y) of all pixels P(x,y) of the image Im are read After the brightness values I(x,y) and the color saturation values Sat(x,y) of all pixels P(x,y) are read, an image processing operation is performed on the pixel P(1,1) so as to increase the brightness value I(1,1) of the pixel P(1,1). Since the image processing operation is based on a logarithmic function computation, the domain of the brightness values I(x,y) of the pixels P(x,y) to be processed should be adjusted before the image processing operation. As such, the brightness values I(x,y) are increased in logarithmic increment. In this embodiment, since the image brightness adjusting method is applied to a HSV (hue, saturation, value) color space, the range of the brightness values I(x,y) is between 0 and 1.

Figure 4A:
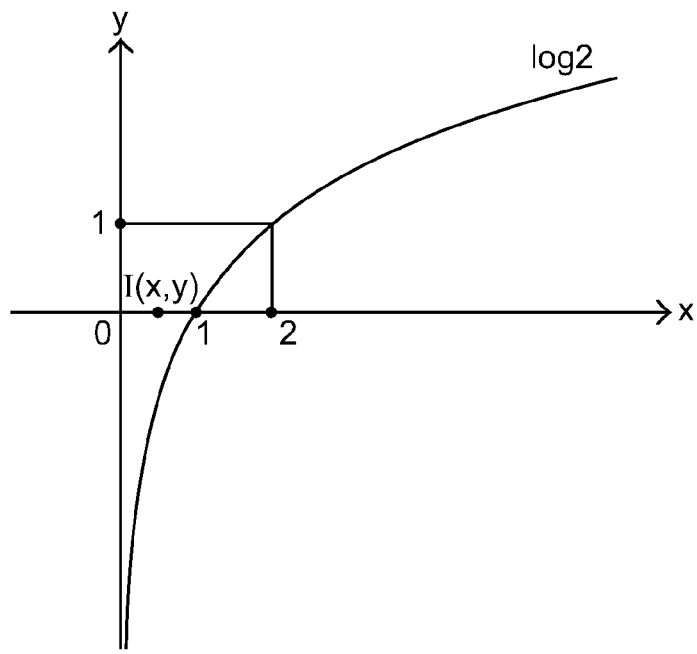
FIGS. 4A and 4B are schematic logarithmic curves used in the image brightness adjusting method of the present invention.
Figure 4B:
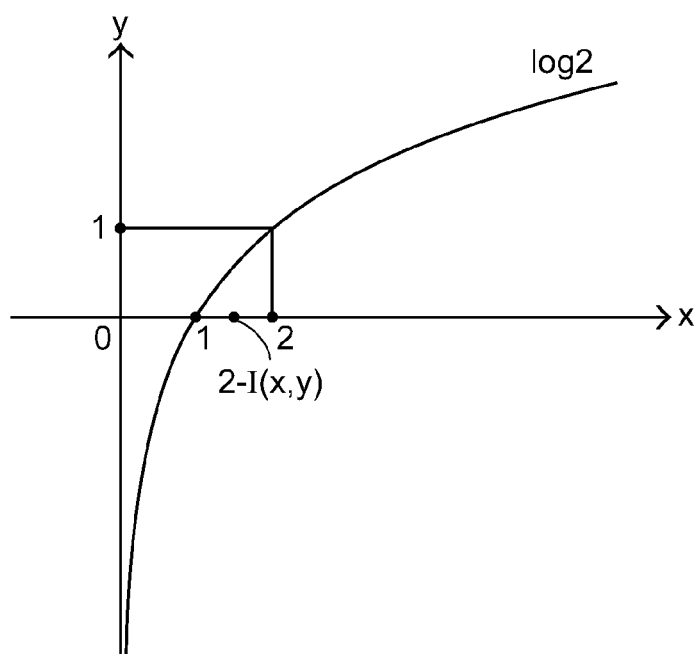

FIGS. 4A and 4B are schematic logarithmic curves used in the image brightness adjusting method of the present invention. In the logarithmic curve of FIG. 4A, the base is 2 and the range of the brightness values I(x,y) is between 0 and 1. For the range of the brightness values I(x,y) between 0 and 1, the domain between 1 and 2 is found. As shown in FIG. 4A, for increasing the brightness value I(x,y) in logarithmic increment, the domain of the input brightness value I(x,y) should lie between 1 and 2. Since the domain of the brightness value I(x,y) is between 0 and 1 but not between 1 and 2, the domain of the brightness value I(x,y) needs to be adjusted. As shown in FIG. 4A, the brightness value I(x,y) of the P(x,y) is between 0 and 1. For adjusting the brightness value I(x,y) of the P(x,y) to lie between 1 and 2, the brightness value I(x,y) is subtracted from the right-end value 2 of the domain. In other words, after a computation of 2−I(x,y) is done, the domain of the brightness value I(x,y) is reversed to lie between 1 and 2, as can been seen in FIG. 4B.

After the domain of the pixel P(1,1) is adjusted, the brightness value I(1,1) of the pixel P(1,1) is subject to a logarithmic function computation, thereby obtaining a gain value G(1,1) by the equation of: G(x,y)=log(2−I(x,y)).

After the gain value G(1,1) is obtained, the brightness value I(x,y) is increased by G(1,1) times and then multiplied by the magnification S, thereby obtaining a brighter brightness value $I_{Brighter}(1,1)$ by the equation of: $I_{Brighter}(x,y)=S\times(1+G(x,y))\times(x,y)$. It is demonstrated experimentally that an optimal brighter brightness value $I_{Brighter}(1,1)$ is acquired if the magnification S is 3.

After the brightness value I(1,1) of the pixel P(1,1) is increased to the brighter brightness value $I_{Brighter}(1,1)$, a brightness-decreasing procedure is performed because the brighter brightness value $I_{Brighter}(1,1)$ is too bright.

In the first stage of the brightness-decreasing procedure, a first brightness decay value $D_{Brightness}(1,1)$ is obtained according to the brightness value I(1,1). The first brightness decay value $D_{Brightness}(1,1)$ corresponds to the sum of 1 and the brightness value I(x,y) to the power of "POWER" by the equation of: $D_{Brightness}(x,y)=1/(1+I(x,y))^{Power}$. It is demonstrated experimentally that an optimal first brightness decay value $D_{Brightness}(x,y)$ is acquired if the power "POWER" is 4. Since the first brightness decay values $D_{Brightness}(x,y)$ of all pixels are determined according to respective brightness values I(x,y). From the equation of: $D_{Brightness}(x,y)=1/(1+I(x,y))^{Power}$, it is found that the first brightness decay values $D_{Brightness}(x,y)$ of all pixels are changed with respective brightness values I(x,y). That is, the brightness decaying degrees of all pixels P(x,y) are distinguished. The first brightness decay values $D_{Brightness}(x,y)$ of this first stage will reduce the brightness values I(x,y) of the pixels P(x,y) with relatively higher values to a larger extent but reduce the brightness values I(x,y) of the pixels P(x,y) with relatively lower values to a smaller extent.

In the second stage of the brightness-decreasing procedure, a second brightness decay value $D_{saturation}(1,1)$ is obtained according to the average color saturation value AvgSat(1,1) of the color saturation values Sat(x,y) of the pixel P(1,1) and its multiple neighboring pixels. For example, the sum of 1 and the average color saturation value AvgSat(1,1) is divided by 2, thereby obtaining the second brightness decay value $D_{saturation}(1,1)$ is deduced by the equation: $D_{saturation}(x,y)=(AvgSat(x,y)+1)/2$. In the context, the average color saturation value AvgSat(x,y) corresponds to the average of the color saturation values Sat(x,y) of the pixel P(x,y) and its nearest neighboring pixels P(x-1, y) P(x+1,y), P(x,y-1), P(x,y+1) or even its somewhat near neighboring pixels such as the pixel P(x+1, y+1). Please refer to FIG. 3 again. In views of the pixel P(1,1), the average color saturation value AvgSat(1,1) is the average of the color saturation values of the pixel P(1,1), the pixel P(1,2), the pixel P(2,1) and the pixel P(2,2). In views of the pixel P(2,2), the average color saturation value AvgSat(1,1) is the average of the color saturation values of the pixel P(2,2) and its eight surrounding pixels. The second brightness decay values $D_{saturation}(x,y)$ of this second stage will reduce the brightness values I(x,y) to an adjustable extent according to the average color saturation values. In other words, the second brightness decay values $D_{saturation}(x,y)$ will reduce the brightness values I(x,y) of the pixels P(x,y) with relatively lower average color saturation values to a higher extent but reduce the brightness values I(x,y) of the pixels P(x,y) with relatively higher average color saturation values to a smaller extent. After the image is compensated with the second brightness decay values $D_{saturation}(x,y)$, the problem of causing unnatural image appearance is solved.

Next, a darker brightness value $I_{Darker}(1,1)$ is obtained according to the first brightness decay value $D_{Brightness}(1,1)$ and the second brightness decay value $D_{saturation}(1,1)$ by the equation: $I_{Darker}(x,y)=D_{Brightness}(x,y)\times D_{saturation}(x,y)$. In the image brightness adjusting method, the darker brightness value $I_{Darker}(x,y)$ corresponds to the overall reduction brightness value.

Afterwards, the brighter brightness value $I_{Brighter}(1,1)$ is multiplied by the darker brightness value $I_{Darker}(1,1)$, thereby obtaining corrected brightness value $I_{Adjusting}(x,y)$ by the equation: $I_{Adjusting}(x,y)=I_{Brighter}(x,y)\times I_{Darker}(x,y)$.

After the corrected brightness value of the pixel (1,1) is obtained, the above image processing steps are performed on the next pixel P(1,2) until the corrected brightness values of all pixels are obtained.

In the above embodiment, the image brightness adjusting method of the present invention is applied to a HSV color space. Nevertheless, the image brightness adjusting method is not restricted to the HSV color space. That is, the image brightness adjusting method of the present invention can be applied to any other color space defined by brightness values and color saturation values. For complying with the color space, the domains of the brightness values are varied.

From the above described, the image brightness adjusting method of the present invention adjusts the brightness values of the image according to the brightness values of all pixels. The brightness values of all pixels are firstly increased in various increasing degrees and then decreased in various decreasing degrees in order to avoid over-increasing the brightness values of the image. Moreover, the use of the color saturation values to adjust the brightness values can avoid the unnatural image appearance. Since the calculation amount of the image brightness adjusting method of the present invention is reduced, the processing speed is faster than the conventional local histogram equalization method. As a consequence, the image brightness adjusting method of the present invention can properly increase the brightness values of the image and acquire natural image appearance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image brightness adjusting method for adjusting brightness values of multiple pixels of an image, all pixels P(x,y) of said image having respective brightness values I(x,y) and respective color saturation values Sat(x,y), said image brightness adjusting method comprising steps of:
  increasing said brightness values I(x,y) of said pixels P(x,y) by a logarithmic function computation, which comprises sub-steps of:
    performing said logarithmic function computation on said brightness values I(x,y) of said pixels P(x,y) to obtain corresponding gain values G(x,y);
    multiplying said brightness values I(x,y) by said gain values G(x,y) to obtain corresponding gained brightness values;
    and amplifying gained brightness values by a magnification S to obtain corresponding brighter brightness values $I_{Brighter}(x,y)$;
  decreasing said brightness values of said image, which comprises sub-steps of:
    decreasing said brightness values I(x,y) of said pixels P(x,y) to obtain corresponding first brightness decay values $D_{Brightness}(x,y)$, wherein said first brightness decay values $D_{Brightness}(x,y)$ are determined according to said brightness values $I(x,y)$ of said pixels $P(x,y)$;

decreasing said brightness values $I(x,y)$ of said pixels $P(x,y)$ to obtain corresponding second brightness decay value $D_{saturation}(x,y)$, wherein said second brightness decay values $D_{saturation}(x,y)$ are determined according to corresponding average color saturation values $AvgSat(x,y)$, and each of said average color saturation values $AvgSat(x,y)$ indicates the average of said color saturation values $Sat(x,y)$ of a specified pixel $P(x,y)$ and neighboring pixels thereof; and obtaining darker brightness values $I_{Darker}(X,y)$ according to said first brightness decay values $D_{Brightness}(x,y)$ and said second brightness decay values $D_{saturation}(x,y)$; and obtaining corrected brightness values $I_{Adjusting}(x,y)$ according to said brighter brightness values $I_{Brighter}(x,y)$ and said darker brightness values $I_{Darker}(x,y)$, wherein said corrected brightness values $I_{Adjusting}(x,y)$ are calculated by following equations:

$$I_{Adjusting}(x,y)=I_{Brighter}(x,y) \times I_{Darker}(x,y);$$

$$I_{Brighter}(x,y)=S \times (1+G(x,y)) \times I(x,y);$$

$$G(x,y)=\log(2-I(x,y));$$

$$I_{Darker}(x,y)=D_{Brightness}(x,y) \times D_{saturation}(x,y);$$

$$D_{Brightness}(x,y)=1/(1+I(x,y))^{Power};$$

$$D_{saturation}(x,y)=(AvgSat(x,y)+1)/2;$$

in which POWER is a power value.

2. The image brightness adjusting method according to claim 1 wherein said image brightness adjusting method is applied to a HSV (hue, saturation, value) color space, and said logarithmic function computation uses a logarithmic function whose base is 2.

3. The image brightness adjusting method according to claim 1 wherein the domain of said brightness values $I(x,y)$ of said pixels $P(x,y)$ between 0 and 1 is adjusted to be between 1 and 2.

4. The image brightness adjusting method according to claim 1 wherein said magnification S is 3.

5. The image brightness adjusting method according to claim 1 wherein said POWER is 4.

* * * * *